July 14, 1942.　　　E. D. BIERETZ　　　2,289,871
TRANSMISSION
Filed July 12, 1940　　　8 Sheets-Sheet 3

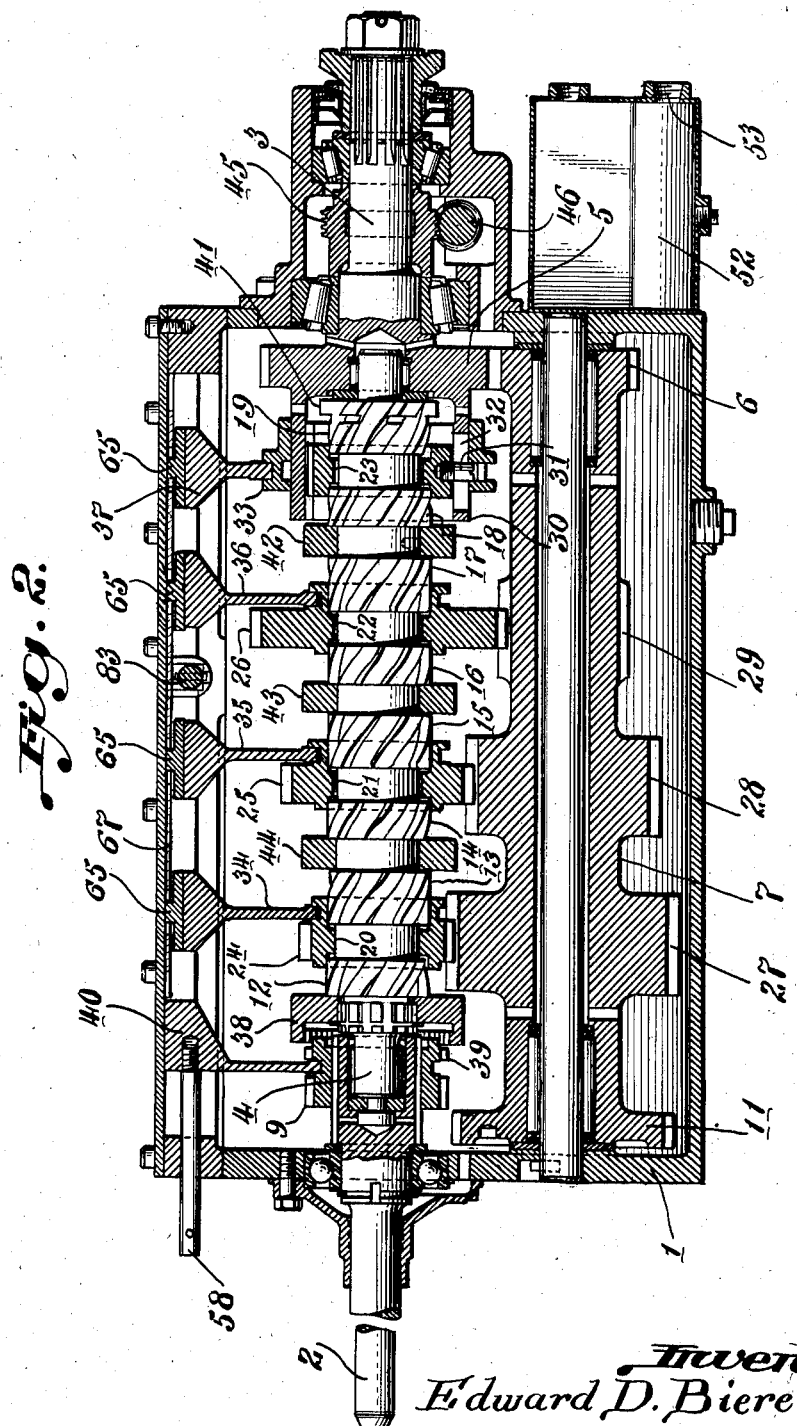

Inventor
Edward D. Bieretz

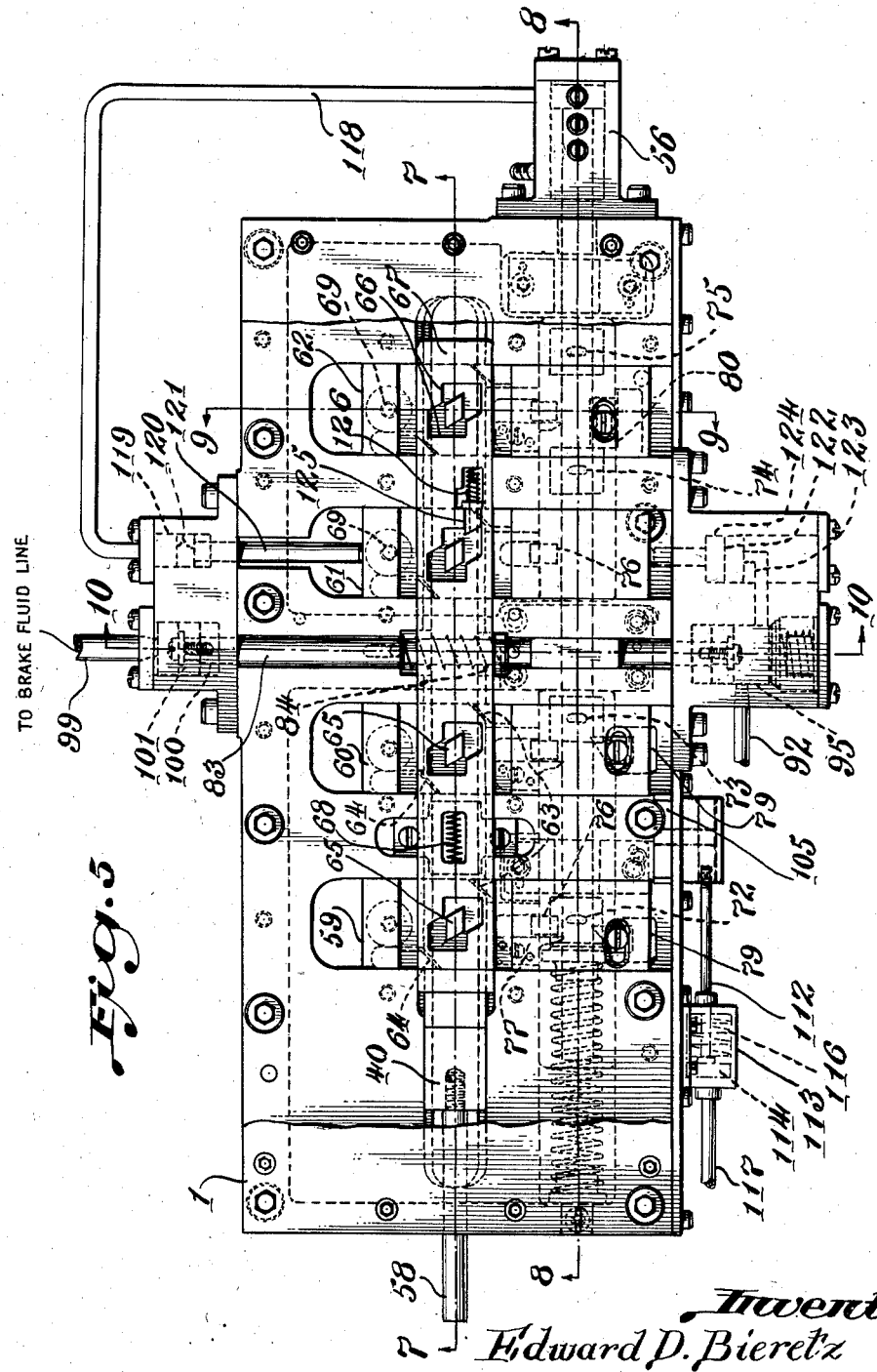

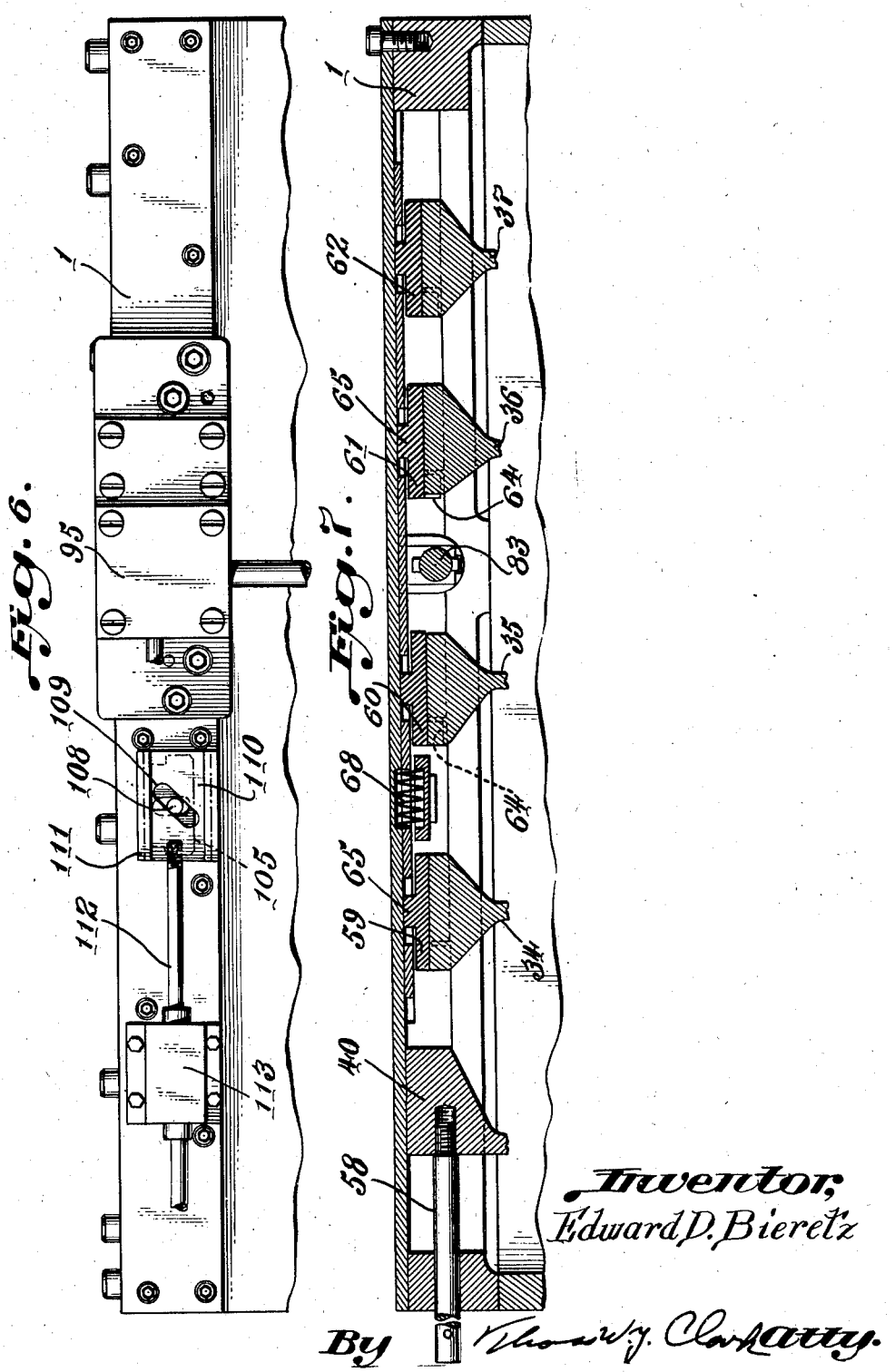

July 14, 1942.  E. D. BIERETZ  2,289,871
TRANSMISSION
Filed July 12, 1940  8 Sheets-Sheet 6
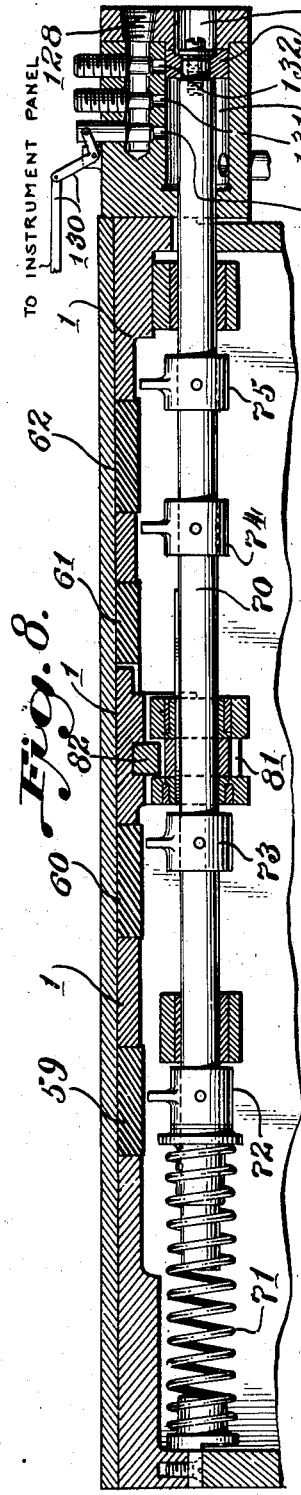
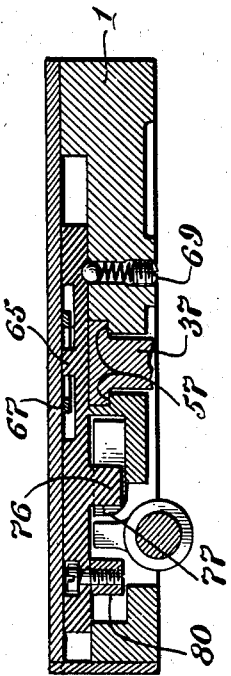
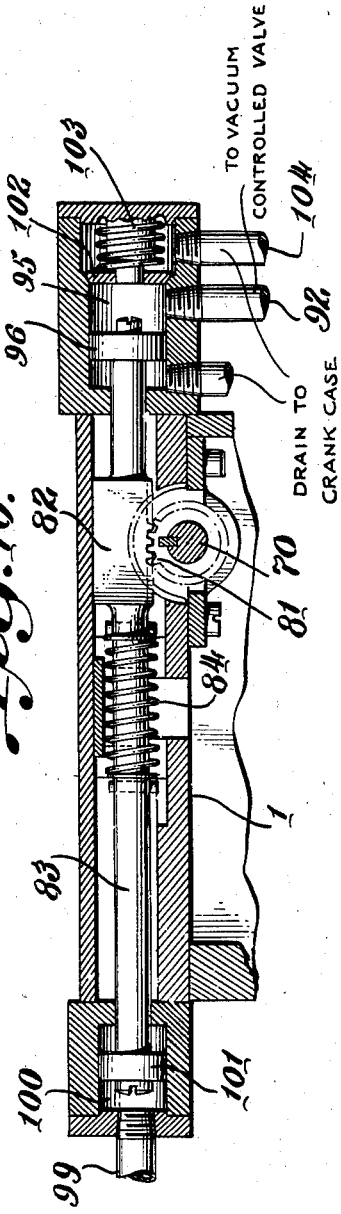
Inventor,
Edward D. Bieretz
By Thomas W. J. Clark
Atty.

July 14, 1942. E. D. BIERETZ 2,289,871
TRANSMISSION
Filed July 12, 1940 8 Sheets-Sheet 7
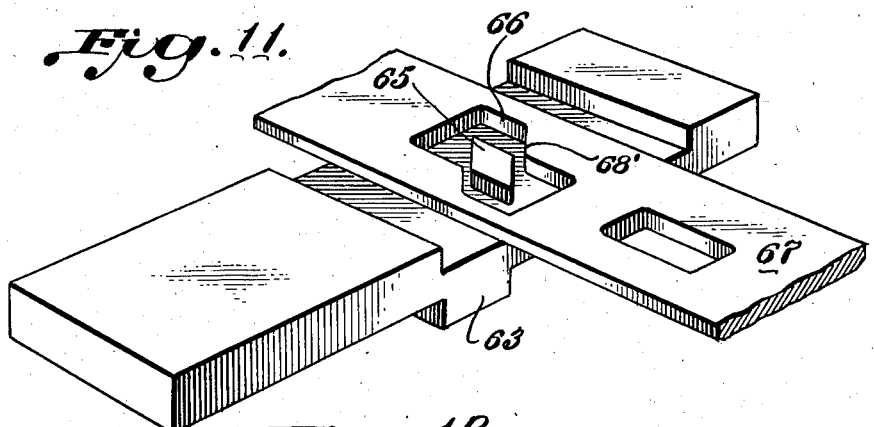
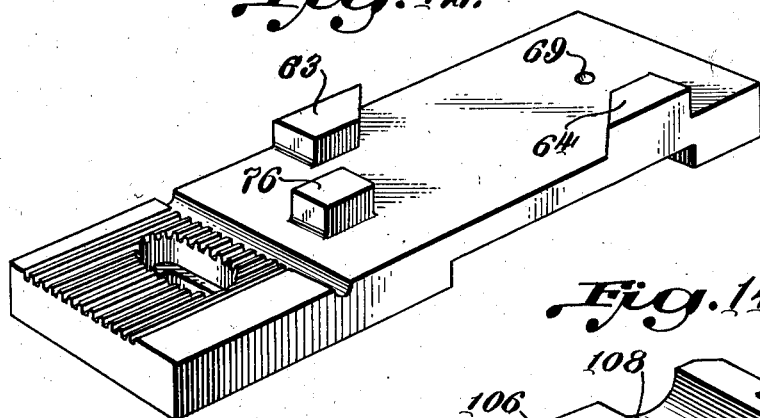
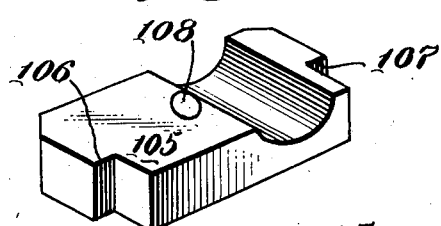
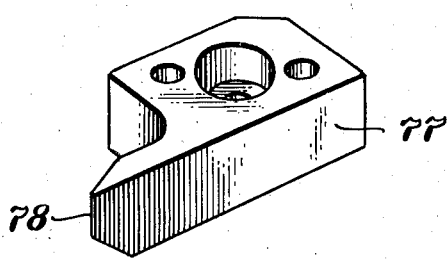
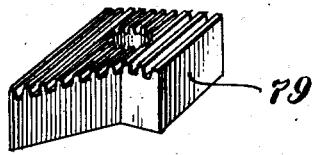
Inventor,
Edward D. Bieretz
By Thomas W. J. Clark
Atty.

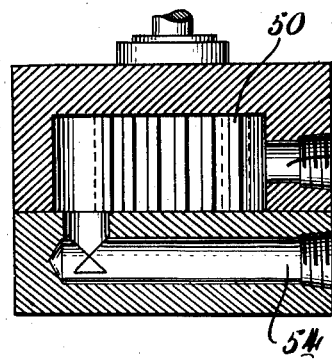
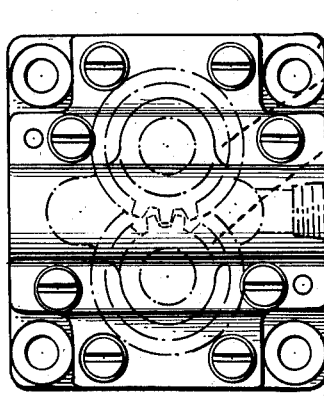
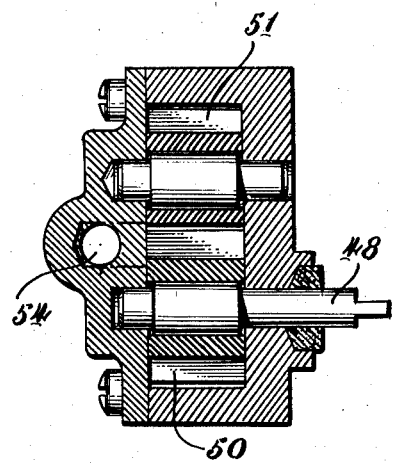
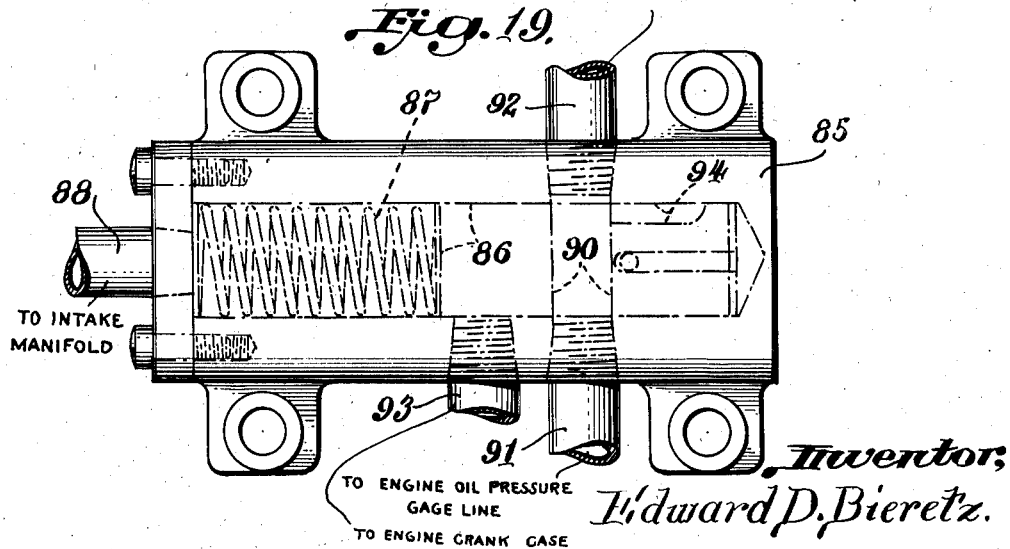

Patented July 14, 1942

2,289,871

UNITED STATES PATENT OFFICE 2,289,871

TRANSMISSION

Edward D. Bieretz, Baltimore, Md.

Application July 12, 1940, Serial No. 345,037

7 Claims. (Cl. 74—336)

The present invention relates to gear transmissions and automatic controlling means therefor, appplicable to any and all types of motor driven machinery.

The purpose of the invention is to provide a power transmission particularly adapted for motor vehicles, having a driver-controlled automatic gear shifting system, without employing the usual gear shifting lever or clutch pedal, and combining a simple overdrive transmission gear contained in the transmission housing, which is operable for selective automatic control of the transmission gears at different driver-determined speeds, so that the car may be operated efficiently and with perfect safety, and at the same time have the benefits of at all times coasting against engine compression without incurring any of the disadvantages which might attend the use of free wheeling or other coasting devices now employed. Further, the automatic controlling means is regulated at the determination of the driver through a novel fluid pressure and vacuum system automatically operated at the operator's determination to accelerate engine speed or to brake the driven or driving units. The vacuum is obtained from the intake manifold and fluid pressures are obtained from the engine oil pressure system, the hydraulic brake fluid pressure system, and an auxiliary gear pump.

Another object of the invention is to furnish a simplified overdrive necessitating only the use of two additional gears, the same as the gears required for low or second gear.

Another object of the invention is to furnish such an automatic mechanism for cars for use in association with the type of gear transmission described in U. S. Patent No. 2,102,781, dated December 21, 1937.

The invention is shown by way of illustration in the accompanying drawings forming a part hereof, and in which:

Figure 2 is a vertical sectional view through the transmission.

Figure 5 is a plan view with the top of the housing partially broken away, showing the mechanical features of the control mechanism.

Figure 6 is a left side view of a portion of the control mechanism.

Figure 7 is a left side elevation of a section through the center of the control, on the line 7—7 of Figure 5.

Figure 8 is a left side elevation of a section of the control on the line 8—8 of Figure 5, showing the cam shaft, operating cams, engine spring, cam operating cylinder, adjustable operating relief ports, and overdrive operating relief.

Figure 9 is a rear view of a section through the control on the line 9—9 of Figure 5, again showing the operating cam, as well as shipper plate and detent.

Figure 10 is a section on the line 10—10 of Figure 5 showing the engine oil pressure operating cylinder, brake fluid pressure operating cylinder, and cam operating shaft.

Figure 11 is a top view of a shipper and interlocking plates.

Figure 12 is a bottom view of the shipper plate.

Figure 13 is a view of a cam positioning and travel limiting horn.

Figure 14 is a view of the first and second gear braking lockout.

Figure 15 is a view of an adjustable shipper plate lug.

Figure 16 is a horizontal section through the center of the auxiliary gear pump.

Figure 17 is a side view of the auxiliary gear pump.

Figure 18 is a vertical section through the center of the auxiliary gear pump.

Figure 19 is a vertical view of the vacuum controlled valve unit.

The transmission is considered in the description and drawings as though mounted horizontally in an automobile with the front end projecting away from the narrator.

Figure 3:
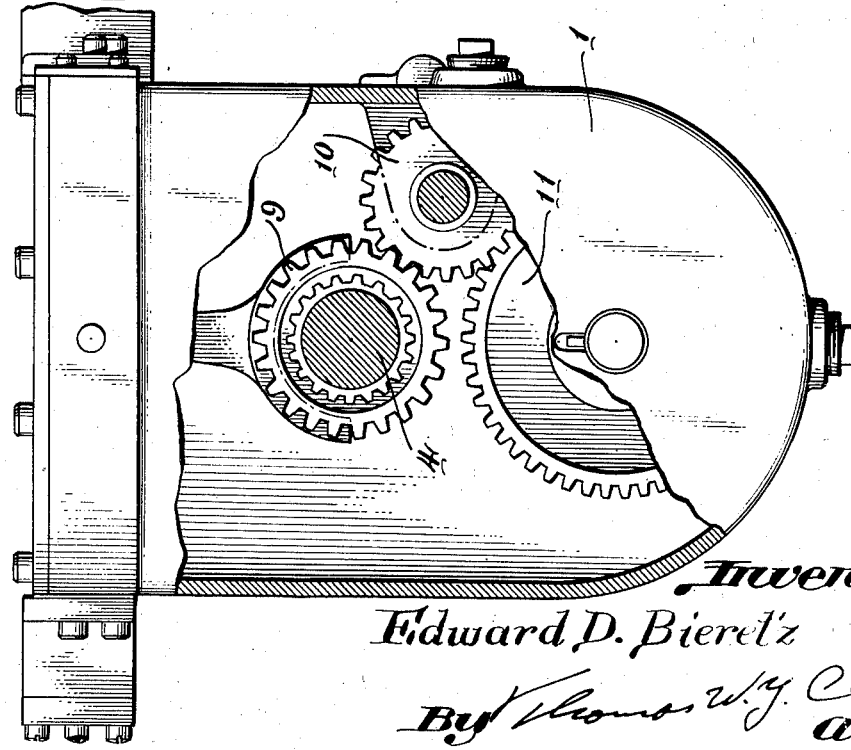
Figure 3 is a front end view of the transmission with a part of the front case removed, showing the reverse idler gear arrangement.

The transmission is mounted in a housing 1 and it has therein a shaft 2 driven from the engine and a shaft 3 in alignment therewith connected with the torque shaft driving the rear wheels of the automobile. These shafts are mounted in ball and roller bearings respectively. Between these shafts and mounted coaxially in bearings in the ends thereof is transmission shaft 4. Integral with shaft 3 is an external gear 5 which is always in mesh with gear 6, which is one of the integrally connected gears on the cluster gear arrangement 7. These cluster gears are mounted on roller bearings on shaft 8 in the lower portion of the transmission housing 1, as shown in Figure 2. Keyed to shaft 2 is sliding clutch 9, which when moved forward on its key meshes with idler gear 10, Figure 3, which is always in mesh with forward gear 11 on cluster gear arrangement 7. When the sliding clutch member 9 is in this position the motor is geared to drive the car in reverse by means of engine shaft 2, clutch 9, gears 10 and 11, 6 and 5 and shaft 3.

Transmission shaft 4 has thereon a plurality of external helical splines 12, 13, 14, 15, 16, 17, 18 and 19. Surrounding the transmission shaft 4 and rotating freely each between a pair of said helical splines are sliding gears having on their internal surfaces internal helical splines 20, 21, 22 and 23 adapted to mesh with the external helical spline either forward or back of the sliding gear depending upon the location of the sliding gear. The first three sliding gears have externally thereof gears 24, 25 and 26, always in mesh with corresponding gears 27, 28 and 29 of the cluster gear arrangement. The sliding gear which carries internal spline 23 is keyed in and slidable longitudinally of an integral collar 30 on spline 5. This sliding gear has pins 31 therein slidable in key ways 32 in collar 30 and these pins may be moved, thereby moving their sliding spline lengthwise of shaft 4 by a collar 33 slidable lengthwise on collar 30. The various sliding gears are movable longitudinally of shaft 4 by shippers 34, 35, 36 and 37 respectively. Shaft 4 has on its forward end clutch ring 38 fast thereto having internal clutch teeth adapted to mesh with external clutch teeth 39 on sliding clutch member 9 when that clutch member is moved rearward. Sliding clutch member 9 is movable as are the other clutch members by shipper 40. When shipper 40 is moved to engage the sliding clutch gear 39 with the clutch ring 38 force from the motor is transmitted from the engine shaft directly to the transmission shaft 4. In this position the transmission is ready for forward movement of the automobile and the speed of that forward movement although of course depending somewhat upon the speed of the motor will likewise depend upon the gearing ratio being used. The ratios are so adjusted that when the spline 20 is in mesh with spline 12 the first or low gear power will be transmitted through the shaft 4 through gear 24 to cluster gear 27 and from cluster gear 6 to gear 5 and to the shaft 3, driving the car. With varying ratios the same arrangement takes place when splines 21 or 22 are brought into use in forward drive. When spline 23, on the other hand, is meshed with spline 18, force is transmitted directly through shaft 4 to shaft 3 and this is the high gear position of the gears. Gears 25 and 28 are so proportioned that when they are in use the car is in second gear. When gears 26 and 29 are in use the car is in overdrive gear.

Splines corresponding to the various forward movement splines are provided to allow the car to move forward against the engine compression, that is, using the engine as a brake in any one of the selected spline positions. When the car is coasting so that the wheels tend to drive their final gear at a more rapid rate than the motor drives its final gear, the internal and external helical splines then in engagement will ride off, one from the other, unscrew, so that the internal helical spline will assume a neutral position between its adjacent two external splines. When the desired shipper is then moved further to the rear, for instance shipper 37, internal spline 23 will mesh with external spline 19, riding back to collar 41 and the forward motion of the car will then be checked by the engine compression with the gear ratios in high gear.

Similar collars 42, 43 and 44 limit the rearward and forward motion of the other internal splines when engaging the respective adjacent external spline. Likewise the internal and external splines used in braking against engine compression tend to ride out into neutral when the car speed is slackened below the speed of the engine.

Constantly driven, when the car is in motion at all, by shaft 3 is the worm 45 fast thereon. This worm drives the usual speedometer shaft 46 to which the speedometer cable may be connected at 47. Clutched to speedometer shaft 46 is the shaft 48 of the auxiliary gear pump 49 mounted on the end of the transmission housing 1. This gear pump has the usual gears 50 and 51 and it takes oil from the reservoir 52 through connections 53 leading into the pump and from the pump the oil is forced through connections 54 to the head of the piston 55 in cylinder 56, shown in Figures 4, 5, 8 and 1.

The shippers 40, 34, 35, 36 and 37 operate in a shouldered groove 57 extending centrally and longitudinally of the transmission housing 1, as best shown in Figure 9 for shipper 37. Shipper 40 is moved longitudinally by rod 58. The other rectangularly headed shippers slide longitudinally in the groove 57.

Rectangularly shaped shipper plates 59, 60, 61 and 62 move transversely of the transmission in horizontally cutout openings formed therefor in the upper part of the housing 1, the openings being best seen from the plan view in Figure 5, and from transverse and longitudinal views, from Figures 8 and 9. The shipper plates are shown in a top perspective view in Figure 11 and a bottom perspective view in Figure 12. Each shipper plate has on its bottom diagonally opposed and angularly sloped lugs each contacting corresponding diagonal faces formed by omitting angular corners on each shipper head. A plan view of these lugs and heads is shown in Figure 5. The lugs on the shipper plates coacting when the plates are moved to the right being indicated at 63 and the opposite lugs being indicated at 64. The effect of moving any of the shipper plates transversely to the right is to contact the corresponding diagonal lug 63 with the adjacent diagonal surface on the shipper and to move that shipper forward longitudinally, opposed diagonal lug 64 retracting out of the way and permitting such forward movement. In the same manner movement of the shipper plate to the left contacts diagonal lug 64 with its adjacent diagonal surface on the shipper head and moves the shipper rearwardly. These movements of the shipper plates place the helical gears either in forward drive position or engine compression braking position respectively.

Each shipper plate has approximately over the center of its respective shipper an angle sided lug 65 which fits in angle sided slots 66 in interlocking plate 67 transversely slidable in a slot made therefor in the upper part of the housing or casing 1 of the transmission. This interlocking plate 67 has a centering spring 68 best shown in Figures 5 and 7, mounted in the housing 1, and which tends to keep the interlocking plate in a central position longitudinally. Movement of any of the shipper plates longitudinally, for instance one to the right, as shown in Figure 11, moves the lug 65 to the right so that it will contact angle 68' of the angle sided slot 66 in interlocking plate 67 thus forcing the plate rearwardly, toward the narrator, against the effect of the centering spring 68. The effect of this movement of the interlocking plate will be to allow any of the other shipper plates to be moved correspondingly to the right but the plate would then prevent their movement to the left.

Similarly a movement of one shipper to the left would move the interlocking plate forward and allow any other shipper to be moved to the left, but prevent the movement of any to the right.

Each shipper plate has a detent 69, best shown in Figure 9, to prevent its unintentional movement.

Piston 55 is at one end of cam shaft 70, which moves longitudinally in the housing 1 and it is held in its extreme rearward position by spring 71. Against the spring, the shaft may be moved longitudinally in substantial proportion to the rate of the forward movement of the automobile, because the force of the oil from the auxiliary gear pump 49 is in exact proportion to this forward movement of the automobile. Cam shaft 70 has thereon a plurality of operating cams 72, 73, 74 and 75. Each of these cams is so placed longitudinally of the shaft that when the shaft is in the appropriate longitudinal position one of them and only one of them will contact an appropriate lug 76 on each shipper plate, when the cam is turned clockwise as shown in Figure 9.

Forward of each lug 76, except that on shipper plate 61, and fastened to the housing 1 is a cam travel limit horn, or projection, 77 having a comparatively sharp edge 78, Figure 13. When the cam turns clockwise to contact one lug 76, should the speed of the car and therefore the force of the gear pump tend to push the cam off the lug, this cam travel limit horn will prevent the cam from riding off the lug. Likewise should the cam tend to strike two lugs 76, the sharp edge 78 will compel the cam shaft to move either forward or backward so that only one lug will be contacted by the appropriate cam.

Each of the shipper plates 59, 60 and 62 likewise have on them an adjustable shipper plate lug. The lug 79 on shipper plates 59 and 60 have the form shown in Figure 15, with a bevelled edge facing toward the cam. The lug 80 on shipper plate 62 is long and rectangular so that it may be contacted over a greater longitudinal movement of the corresponding cam 75 on cam shaft 70 when the same is turned counter-clockwise.

Turning the cam shaft clockwise will move the corresponding shipper plate to the right, moving the shipper forward and placing the car in forward movement. Moving the cam shaft counterclockwise will move the shipper plate to the left and move the corresponding helical gears into engine compression braking position. Shipper plate 61 has no adjustable shipper plate lug. These lugs are adjustable by placing the corresponding projections in any of the desired openings, as shown in Figures 12 and 15 and then attaching them together by one screw.

The cam shaft 70 has fixed therein a key and the shaft and key are slidable longitudinally in a groove in gear 81, so that rotation of the gear 81 rotates shaft 70, and gear 81 is in turn rotated by rack 82 on cam operating shaft 83, Figures 5 and 10, extending transversely across the transmission in housing 1. This shaft has centering spring 84 always tending to maintain it in a centralized or neutral position, as shown in Figure 10. In this position all the cams on cam shaft 70 are upright, not contacting lugs on either side, but movement of the cam operating shaft in either direction rocks the cams setting in motion the desired forward or braking effect.

Figure 1:
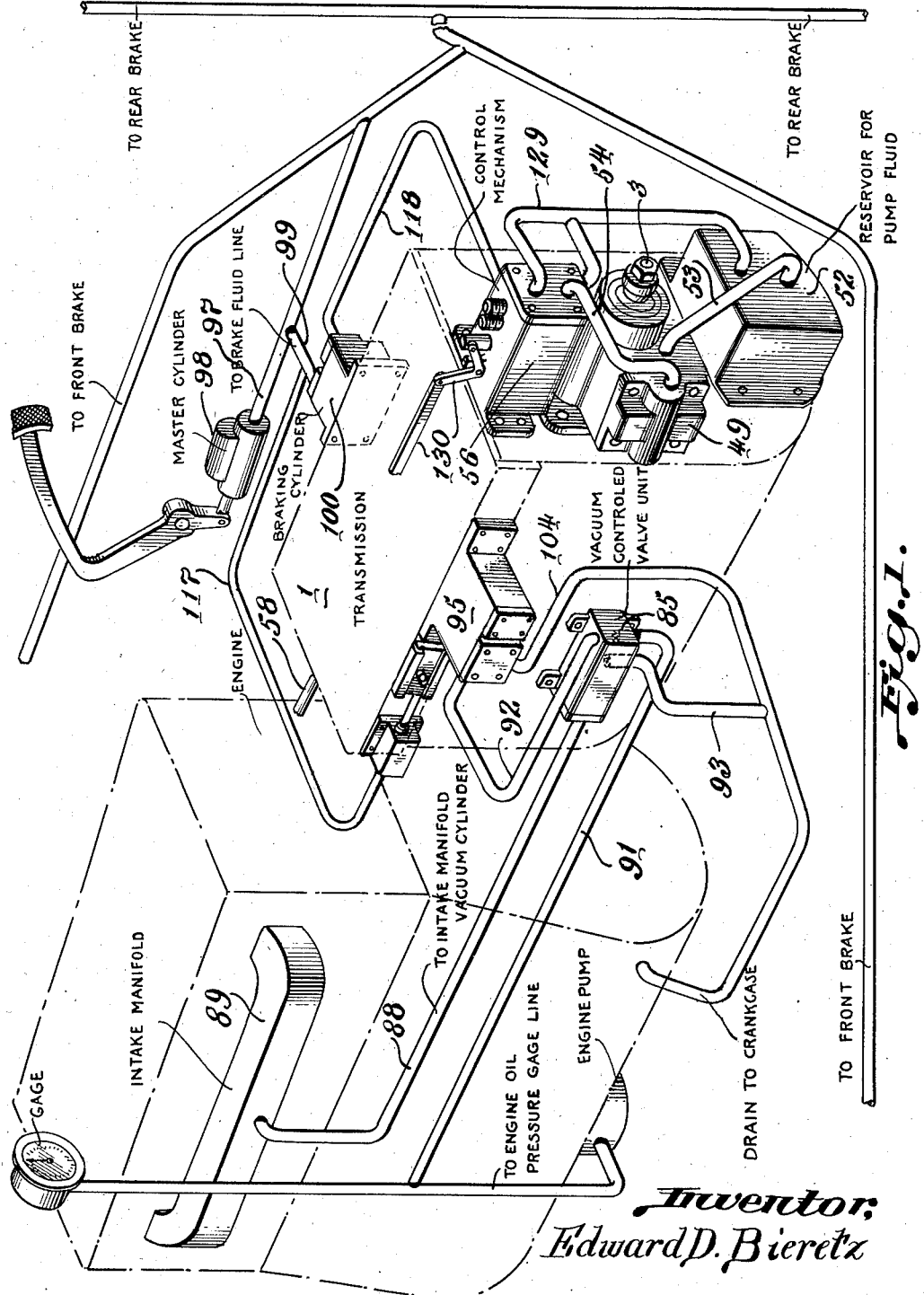
Figure 1 is a diagrammatic view or layout of the system and mechanism as applied to the engine and transmission of an automobile.
Figure 4:
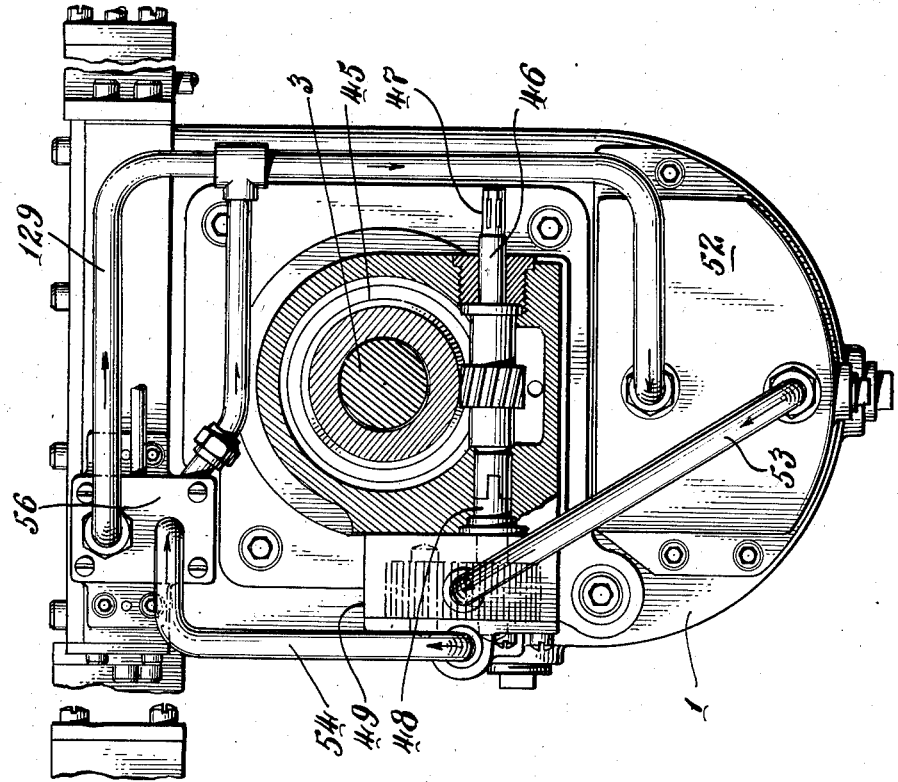
Figure 4 is a rear end view with a section of the transmission shaft housing, showing the auxiliary gear pump arrangement, and the method whereby the speedometer and the gear pump are driven.

Vacum controlled valve unit 85 is placed on one side of the transmission casing or housing 1 as shown in Figure 1. This unit has a piston 86 constantly forced to the right, as shown in Figure 19, by spring 87, but which may be pulled to the left against the force of the spring by a vacuum being created at its rear in pipe 88 leading to the intake manifold 89 of the automobile. Piston 86 has passing therethrough a port 90 which connects pipes 91 and 92 when the piston is in its extreme right position. When the vacuum is operating upon the piston and it is moved to the left pipe 92 is connected with pipe 93 through ports 94 and 90 in the piston. Pipe 91 is connected with the engine oil pump, as shown in Figure 1, so that when the vacuum in pipe 88 is broken, engine oil is forced through pipe 91 and port 90 to pipe 92 into cylinder 95 where the oil pressure operates upon piston 96 on cam operating shaft 83, pushing the same to the left, as shown in Figure 10, turning the cam clockwise, as shown in Figure 9. When the vacuum is again effective on the piston 86 the piston 86 moves to the left, interrupting the flow of oil from the engine pump and allowing the oil from the cylinder 95 to drain back from pipes 92, ports 94 and 90 to pipe 93 leading to the crankcase drain thus allowing the centering spring 84 to move all the cams back to neutral.

The cams are moved in the opposite position, that is to effect engine compression braking, by admitting fluid from the brake fluid line 97 from the master cylinder 98 passing it through pipe 99 to cylinder 100. The fluid acts upon piston 101 attached to the other end of cam operating shaft 83.

Normal pressure on the brake pedal allows the shaft 83 to move back at a suitable rate of speed for effecting engine compression braking, but should it be desirable to effect that braking very rapidly poppet valve 102 in cylinder 95 springs back against the force of spring 103, when the brake is put on very rapidly, so as to drain the engine oil from the cylinder 95 through the poppet valve and pipe 104 back to the crankcase drain.

In the ordinary use of the transmission, engine compression braking in first and second gear is prevented by means of lockout plate 105 on the side of the engine casing. The plate being shown in perspective is Figure 14. This plate moves vertically in a cutout section of the casing 1, Figure 5, which prevents it from turning from its true vertical sliding position. It has shoulders 106 and 107 which in its normal position contact the ends of shipper plates 59 and 60 respectively at their corners and prevent their movement to the left to effect engine compression braking. This lockout plate 105 has pin 108, Figure 6, fixed therein and passing through a vertical slot in the side of the housing 1 and through oblique slot 109 in plate 110. This plate slides horizontally in guides 111 and is attached to rod 112 operating in cylinder 113 with piston 114 attached to the end thereof. This piston is held retracted in the cylinder by spring 116 and in this retracted position, by the force of this spring 116, plate 105 is held up in its first and second gear braking lockout position.

When the brake is put on rapidly or hard as above suggested, braking fluid also passes from pipe 99 through pipe 117 to cylinder 113 and pushes rod 112 to the right, as shown in Figure 6. Pushing the plate 110 to the right, the oblique slot 109 bears down on pin 108 and retracts the lockout plate so as to allow the functioning of the engine compression braking set in motion by shipper plates 60 and 59 either consecutively in this order or if the brake pressure is sufficiently great then only of the low gear braking of shipper plate 59.

An opening in cylinder 56 to the left of piston 55 in Figure 8 is connected with pipe 118 leading to cylinder 119. When pressure from the gear pump 49 is sufficiently great to push the piston 55 sufficiently far to the left in Figure 8 to allow some of the pressure to pass through this pipe 118 piston 120 on rod 121 moves shipper plate 61 to the left, that is, in engine compression braking position, where it remains substantially at all times when some other braking position or forward driving position are not operative as will be hereinafter described.

Cylinder 122 receiving oil pressure from cylinder 95 through a connection 123 operating piston 124 at the other end of shipper plate 61, restores that plate to neutral position instantaneously with operation of the brake pedal, which operation causes some of the captivated oil in cylinder 95 to pass through the opening 123 and move the shipper plate 61 back to neutral.

When any of the lower gears go into braking position, lockout 125, Figure 5, resiliently held forward by spring 126 prevents shipper plate 61 from moving into braking position but the retractable point of the lockout permits the shipper plate 61 to move into neutral position itself when lower braking ratios are placed in operation.

Should it not be desirable to use the highest gear often referred to as overdrive, and set in operation by shipper plate 61, that use could be omitted. It is put into operation by movement of cam shaft 70 to its extreme forward position by means of great pressure from the gear pump operating on piston 55 in cylinder 56. The opening of relief port 127 would allow fluid from pipe 54 to escape through the cylinder 56 and the relief port 127 to vent 128 connected with pipe 129 leading back to reservoir 52. This relief port 127 may be kept permanently open by means of levers 130 leading to the instrument panel.

The adjustment of the port openings 131 and 132 allows for accurate adjustment of the position of cam shaft 70 in accordance with the desired position caused by the pressure generated by the gear pump 49 and consequently, in accordance with the speed of the car. The various gear ratios being made effective therefor between predetermined limits of car speed. Escape from these ports leads similarly to vent 128 and pipe 129 to reservoir 52.

In the ordinary operation of the transmission in shifting from one gear to the other the use of a clutch is not required but in starting an automobile or other heavy machinery, should the transmission be used thereon, a clutch may be desired when the automobile or machinery is first set in motion with the low gear or when the reverse gear is used.

Shift rod 58 may be operated from the panel of the automobile having the three positions of reverse, neutral and forward drive. When it is in position for forward drive the accelerator pedal is then stepped upon.

The vacuum in the intake manifold is reduced when in the usual motor operation the foot is placed upon the accelerator. In this transmission the reduction of the vacuum therefore admits engine oil pressure through pipe 91 to vacuum controlled valve unit 85 and pipe 92 to cylinder 95 which immediately turns cam 72 clockwise, the cam being so placed on cam shaft 70 as to be ready for contact with lug 76 of shipper plate 59 without any pressure being received from the gear pump, as illustrated in Figure 8. Turning the cam 72 clockwise shifts the first or low gears 24 and 27 into driving operation. As soon as this is done the gear pump begins to build up pressure back of piston 55, but this pressure is not sufficient to move the cam shaft 70 forward to admit pressure to pipe 118 to move shipper plate 61 into braking position. As soon as a faster speed is desired the accelerator pedal is released allowing the engine oil to drain back to the crankcase through the vacuum controlled valve unit and pipe 93. The decrease of engine speed will cause spline 20 to ride off spline 12, into neutral, and balancing spring 84 will restore the cam operating shaft and cams to neutral. When pressure is again applied to the accelerator the pressure built up by the auxiliary gear pump is sufficient to move cam shaft 70 forward so that cam 73 moves its shipper plate 60 and the gears assume second gear forward drive position.

In accomplishing the next forward speed the pressure built up by the gear pump is sufficient to pass pressure through pipe 119 and to move shipper plate 61 into engine compression braking position immediately prior to the restoration of the cam shaft to its normal position by withdrawing the foot from the accelerator pedal. Upon again placing the foot on the accelerator pedal the high gear or direct shaft drive is placed into operation through the movement of cam 75 considerably forward. This time because of the increased pressure from the gear pump 49 and when the engine oil turns the cam clockwise against high gear shipper plate 62, or lug 76 thereon, the high gear is placed in position and immediately prior thereto the engine compression braking caused by shipper plate 61 is withdrawn, because of the speeding up of the engine faster than the ground wheels and their connection through the gearing riding out of braking position and into neutral the internal spline 22 and external spline 17.

If the operator prefers to change from low gear to high gear, skipping second gear, he can do so by keeping his foot on the accelerator pedal while in low gear until the car reaches a speed within the high gear speed range of from fifteen miles per hour up. Upon removing and immediately replacing his foot from and on the accelerator pedal, the transmission will automatically change from low gear to high gear.

When it is desired to go into overdrive, bringing into use gears 26 and 29, the same steps are again repeated. This overdrive position of the cam shaft 70 can be completely locked out by use of the overdrive operating release levers 130, the final lever of which may be mounted on the instrument panel.

If, in going up a steep grade, and the car is in overdrive gear set, the car loses momentum and it is desired to change back to high gear, it is only necessary to lift the foot off the accelerator, pull overdrive release lever out, and immediately place the foot back on the accelerator when the car will be instantly in high gear, without awaiting reduced car momentum.

In addition to the usual hydraulic brake and sometimes even independent of its operation it is desirable to coast against engine compression. As above stated shipper plate 61 is always in engine compression braking position except at low gear and between low and second gear and since it is connected with the highest gear drive in the transmission its helical splines on shaft 4 will always ride out into neutral by increasing the speed of the engine, through actuation of the accelerator, over the speed of the gears connected with the ground wheels. Likewise these splines will always ride out after placing in operation a lower gear ratio.

When first beginning coasting, assuming that the overdrive is in operation, without any pressure on the brake pedal or accelerator the helical driving splines on shaft 4 would ride to neutral but instantly the overdrive breaking position of shipper plate 61 would be placed into operation by the action of the gear pump actuating piston 121. The car would then be in overdrive engine compression braking position. Were it desired to go slower the operator would gently place his foot on the brake, the long rectangular lug 80 being long enough to be contacted by cam 75 when the cam shaft 70 is in either high gear or overdrive position, this slight pressure on the brake immediately moves the high gear helical spline into engine compression braking position. The driver could coast at this rate at will, even taking his foot from the brake pedal.

Should he desire to go yet slower, a further press upon the brake pedal will shift second gear, shipper plates, shippers and gears into engine compression braking position. However, this braking position would not be attained without a rather firm press on the brake pedal to withdraw first and second gear lockout plate 105 out of the way of shipper plates 60 and 59. In case of emergency this pressure would always be hard and sufficiently sudden to cause the withdrawal of this lockout plate. In Figures 5 and 15 it is noted that the shipper plate lugs 79 are angularly disposed toward the cams 72 and 73. As the car slows down and the cam shaft 70 is pushed back rearwardly by the spring 61 and the pressure is released on piston 55, the tendency is after the second gear has become effective, for the cam 73 to slip from its shipper plate lug 79, that is from second gear braking position, and for cam 72 to engage its lug so as to bring the car to the low gear engine compression braking position.

If at any speed in excess of the second gear speed range, regardless of whether the transmission is in low gear, second gear, high gear, or overdrive gear, the operator desires to stop or retard the speed of the car, he simply applies normal pressure to the brake pedal, which causes the transmission to automatically and instantly shift from overdrive to high gear, thus producing the same result as a conventional gear transmission equipped car having the brake pedal applied while the car is in high gear.

On the other hand, if he desires to stop the car quickly in an emergency, upon application of pressure to the brake pedal in the manner that would ordinarily apply in an emergency, the transmission automatically and successively changes from high gear to second gear, and even to low gear as and if the brake pedal pressure applied is sufficiently great—without any of the higher gears becoming disengaged until the succeeding lower gear has become engaged.

When the car gets down to a speed under approximately eight or ten miles per hour, whatever braking gear is in service in the transmission automatically becomes disengaged so that the car is, at this low speed, operating as if it were in free wheeling subject to brake retardation only. If, while at a dead stop, or while moving at any speed under approximately five or six miles per hour, the operator applies his foot to the accelerator pedal, the transmission will automatically shift to low gear and the car move forward accordingly.

In addition, not shown on the drawings, there may be used in connection and operating jointly with the push and pull arrangement operating shift rod 58, Figure 2, an auxiliary valve shutting off oil engine pressure from the control system located in pipe line 91, Figure 1, thus preventing any splines being placed in forward motion position when reverse motion of the car is desired. Further in addition, when the transmission is set for reverse motion, should any one of the forward driving splines, by reason of accidental damage to the control system, become engaged on the transmission shaft, nothing could occur, because that shaft is a free floating shaft in both end journals when transmission is set for reverse or no motion of the car.

This invention provides for selective control without the aid of the usual gear shift lever and clutch pedal to automatically and effectively change the transmission gears at the discretion of the operator, and in all respects the car will operate with perfect safety and at the same time possess the benefits of at all times coasting against optional engine compression effects. Through the simple operation of placing the foot on the accelerator or on the brake pedal or on neither accordingly, as acceleration, deceleration or coasting against engine braking compression effects is desired.

Quicker stopping results from low and second gear braking being automatically provided in and through emergency application of brake pedal pressure. Quicker getaway is provided through instantaneous gear changes, without shocks or jerks.

What I claim as new and desire to secure by Letters Patent is:

1. A transmission comprising driving and driven rotating shafts, means for effecting coupling in varying ratios between said shafts, including a plurality of gears, some being displaceable in alternate directions, one, for effecting driving and the other, for effecting retarding coupling, each said alternate coupling utilizing the same displaceable gear, an oscillating and longitudinally movable shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft.

2. A transmission comprising driving and driven rotating shafts, means for effecting coupling in varying ratios between said shafts, including a plurality of gears, some being displaceable in alternate directions, one, for effecting driving and the other, for effecting retarding coupling, each said alternate coupling utilizing the same displaceable gear, an oscillating and longitudinally movable shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft, and positive means to limit the longitudinal position of said movable shaft after the same has been oscillated for increasing the speed of said driven shaft.

3. A transmission comprising driving and driven rotating shafts, means for effecting coupling in varying ratios between said shafts, including a plurality of gears, some being displaceable in alternate directions, one, for effecting driving and the other, for effecting retarding coupling, each said alternate coupling utilizing the same displaceable gear, an oscillating and longitudinally movable shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft, and positive means to direct the longitudinal position of said shaft to a single speed change in oscillating the same to effect an increase of speed of said driven shaft.

4. A transmission comprising driving and driven rotating shafts, means for effecting coupling in varying ratios between said shafts, including a plurality of gears, some being displaceable in alternate directions, one, for effecting driving and the other, for effecting retarding coupling, each said alternate coupling utilizing the same displaceable gear, an oscillating and longitudinally movable shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft, means to automatically bring one of said gears into retarding coupling position between the periods of shifting from certain of said driving coupling positions to others.

5. A transmission comprising driving and driven rotating shafts, means for effecting coupling in varying ratios between said shafts, including a plurality of gears, some being displaceable in alternate directions, one, for effecting driving and the other, for effecting retarding coupling, each said alternate coupling utilizing the same displaceable gear, an oscillating and longitudinally movable shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft, means controllable by the operator to lock out of operation certain retarding coupling positions of said gears.

6. A transmission comprising driving and driven rotating shafts, means for effecting coupling in varying ratios between said shafts, including a plurality of gears, some being displaceable in alternate directions, one, for effecting driving and the other, for effecting retarding coupling, each said alternate coupling utilizing the same displaceable gear, an oscillating and longitudinally movable shaft extending parallel to said driven shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft.

7. A transmission comprising driving and driven rotating shafts, means for effecting coupling in varying ratios between said sheets, including a plurality of gears, some being displaceable in alternate directions, one, for effecting driving and the other, for effecting retarding coupling, each said alternate coupling utilizing the same displaceable gear, an oscillating and longitudinally movable shaft having spaced members longitudinally thereof and means to move said movable shaft longitudinally a distance proportionate to the speed of the driven shaft, a plurality of members, one for each said displaceable gear, slidable transversely of said movable shaft, each being movable by one of said spaced members on said movable shaft, a plurality of means transmitting movement of said slidable members to one of said displaceable gears, oscillation of said movable shaft in one direction placing into driving coupling position a gear effecting a change of the driven speed of said driven shaft, oscillation thereof in the other direction placing into retarding coupling position a gear effecting a change of the retarding speed of said driving shaft, hydraulic motor means to oscillate said movable shaft to effect driving coupling of said gears, and means acting independently of said motor means to oscillate said movable shaft to effect retarding coupling of said gears.

EDWARD D. BIERETZ.